(12) United States Patent
Mraz et al.

(10) Patent No.: US 8,565,237 B2
(45) Date of Patent: *Oct. 22, 2013

(54) CONCURRENT DATA TRANSFER INVOLVING TWO OR MORE TRANSPORT LAYER PROTOCOLS OVER A SINGLE ONE-WAY DATA LINK

(75) Inventors: Ronald Mraz, South Salem, NY (US); James Hope, Greenwich, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,065

(22) Filed: Feb. 8, 2012

(65) Prior Publication Data

US 2012/0151075 A1 Jun. 14, 2012

Related U.S. Application Data

(63) Continuation of application No. 11/788,157, filed on Apr. 19, 2007, now Pat. No. 8,139,581.

(51) Int. Cl.
*H04L 12/56* (2011.01)

(52) U.S. Cl.
USPC ......... 370/392; 370/395.3; 709/245; 713/151

(58) Field of Classification Search
None
See application file for complete search history.

(56) References Cited

U.S. PATENT DOCUMENTS

| | | | |
|---|---|---|---|
| 4,672,601 A | 6/1987 | Ablay | |
| 5,282,200 A | 1/1994 | Dempsey et al. | |
| 5,703,562 A | 12/1997 | Nilsen | |
| 5,769,527 A | 6/1998 | Taylor et al. | |
| 5,983,332 A | 11/1999 | Watkins | |
| 6,108,787 A | 8/2000 | Anderson et al. | |
| 6,141,324 A | 10/2000 | Abbott et al. | |
| 6,262,993 B1 | 7/2001 | Kirmse | |
| 6,377,544 B1 | 4/2002 | Muthukrishnan et al. | |
| 6,377,574 B1 | 4/2002 | Endo | |
| 6,415,329 B1 | 7/2002 | Gelman et al. | |
| 6,546,422 B1 | 4/2003 | Isoyama et al. | |
| 6,665,268 B1 | 12/2003 | Sato et al. | |
| 6,711,166 B1 | 3/2004 | Amir et al. | |
| 6,728,213 B1 | 4/2004 | Tzeng et al. | |
| 6,731,625 B1 | 5/2004 | Eastep et al. | |
| 6,792,432 B1 | 9/2004 | Kodavalla et al. | |

(Continued)

FOREIGN PATENT DOCUMENTS

WO WO 2004/105297 A2 12/2005

OTHER PUBLICATIONS

Nilsen, Curt A., Information Security implementations for Remote Monitoring; Symposium on Int'l Safeguards, Int'l Atomic Energy Agency, Vienna, Austria, Oct. 13-17, 1997.

(Continued)

*Primary Examiner* — Alex Skripnikov

(74) *Attorney, Agent, or Firm* — Amster, Rothstein & Ebenstein LLP

(57) ABSTRACT

A data transfer application for concurrent transfer of data streams based on two or more transport layer protocols via a single one-way data link. The present invention provides a great degree of routing flexibility by providing seamless network connectivity under a plurality of transport layer protocols, such as TCP and UDP, between multiple source and destination platforms over a single one-way data link.

11 Claims, 6 Drawing Sheets

(56) References Cited

U.S. PATENT DOCUMENTS

| | | |
|---|---|---|
| 6,792,502 B1 | 9/2004 | Pandya et al. |
| 6,807,166 B1 | 10/2004 | Ohura |
| 6,822,943 B1 | 11/2004 | Mantin |
| 6,937,562 B2 | 8/2005 | Farley et al. |
| 6,988,148 B1 | 1/2006 | Sheth |
| 7,016,085 B2 | 3/2006 | Gonzalez et al. |
| 7,020,697 B1 | 3/2006 | Goodman et al. |
| 7,085,236 B2 | 8/2006 | Oldak et al. |
| 7,095,739 B2 | 8/2006 | Mamillapalli et al. |
| 7,246,156 B2 | 7/2007 | Ginter et al. |
| 7,260,833 B1 | 8/2007 | Schaeffer |
| 7,339,929 B2 | 3/2008 | Zelig et al. |
| 7,356,581 B2 | 4/2008 | Hashimoto |
| 7,370,025 B1 | 5/2008 | Pandit |
| 7,389,323 B2 | 6/2008 | Tanimoto |
| 7,440,424 B2 | 10/2008 | Nam et al. |
| 7,454,366 B2 | 11/2008 | Kato |
| 7,512,116 B2 | 3/2009 | Ohura |
| 7,529,943 B1 | 5/2009 | Beser |
| 7,616,661 B2 * | 11/2009 | Park et al. ............... 370/474 |
| 7,675,939 B2 | 3/2010 | Kawamura et al. |
| 2002/0003640 A1 | 1/2002 | Trezza |
| 2002/0118671 A1 | 8/2002 | Staples et al. |
| 2002/0120578 A1 | 8/2002 | Sy |
| 2002/0129106 A1 | 9/2002 | Gutfreund |
| 2003/0031180 A1 | 2/2003 | Datta et al. |
| 2003/0051026 A1 | 3/2003 | Carter et al. |
| 2003/0058810 A1 | 3/2003 | Petronic |
| 2003/0103089 A1 | 6/2003 | Ramani et al. |
| 2003/0119568 A1 | 6/2003 | Menard |
| 2003/0172145 A1 | 9/2003 | Nguyen |
| 2003/0195932 A1 | 10/2003 | Tanabe et al. |
| 2004/0103199 A1 | 5/2004 | Chao et al. |
| 2004/0223497 A1 | 11/2004 | Sanderson et al. |
| 2004/0236547 A1 | 11/2004 | Rappaport et al. |
| 2004/0236874 A1 | 11/2004 | Largman et al. |
| 2004/0255329 A1 | 12/2004 | Compton et al. |
| 2005/0005154 A1 | 1/2005 | Danforth et al. |
| 2005/0033990 A1 | 2/2005 | Harvey et al. |
| 2005/0037787 A1 | 2/2005 | Bachner, III et al. |
| 2005/0091396 A1 | 4/2005 | Nilakantan et al. |
| 2005/0201373 A1 | 9/2005 | Shimazu et al. |
| 2005/0216421 A1 | 9/2005 | Barry et al. |
| 2005/0259587 A1 | 11/2005 | Wakumoto et al. |
| 2006/0059253 A1 | 3/2006 | Goodman et al. |
| 2006/0104288 A1 | 5/2006 | Yim et al. |
| 2006/0114566 A1 | 6/2006 | Ohmori et al. |
| 2006/0133350 A1 | 6/2006 | Lowmaster et al. |
| 2006/0133386 A1 | 6/2006 | McCormack et al. |
| 2006/0153092 A1 | 7/2006 | Matityahu et al. |
| 2006/0153110 A1 | 7/2006 | Morgan et al. |
| 2006/0173850 A1 | 8/2006 | Auer et al. |
| 2006/0174032 A1 | 8/2006 | Winchester et al. |
| 2006/0206300 A1 * | 9/2006 | Garg et al. ............... 703/27 |
| 2006/0209719 A1 | 9/2006 | Previdi et al. |
| 2006/0274706 A1 | 12/2006 | Chen et al. |
| 2007/0223158 A1 | 9/2007 | Ma et al. |
| 2009/0024612 A1 | 1/2009 | Tang et al. |

OTHER PUBLICATIONS

Nilsen, Curt A. et al., The Secure Data Mirror; INMM; Nuclear Materials Management; vol. XXVII (No. 2), 39th Annual Mtg. Proceedings, Naples, FL, Jul. 26-30, 1998, pp. 1322-1327.

"Veto Uni-directional Network Bridge and Data Pump Applications White Paper", UNB and DPA White Paper by Tenix Datagate Pty Ltd, 2002, pp. 1-6.

Westmacott J., "Unidirectional Networking: GIAC Security Essential Certification Practical Assignment Version 1.46", SANS Institute, 2003.

M: Anderson, C. North, J. Griffin, R. Milner, J. Yesberg, K. Yiu, "Starlight: Interactive Link," 1996, Defence Science & Technology Organisation, Salisbury, South Australia, Australia.

"Interactive Link White Paper," Jul. 27, 2001, Tenix Defence Pty Ltd, Mawson Lakes, South Australia, Australia.

* cited by examiner

CONCURRENT DATA TRANSFER INVOLVING TWO OR MORE TRANSPORT LAYER PROTOCOLS OVER A SINGLE ONE-WAY DATA LINK

CROSS REFERENCE TO RELATED APPLICATIONS

This patent application is a continuation of U.S. application Ser. No. 11/788,157, filed Apr. 19, 2007 now U.S. Pat. No. 8,139,581, the contents of which are incorporated herein by reference in their entirety.

FIELD OF INVENTION

The present invention relates generally to unidirectional data transfer. More particularly, the present invention relates to concurrent data transfer involving two or more transport layer protocols over a one-way data link.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 Patent"), the contents of which are hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms (or nodes) 101 and 102 (respectively, "the Send Node" and "the Receive Node") are connected to the unsecured external network 104 ("the source network") and the secure network 105 ("the destination network"), respectively. The Send Node 101 is connected to the Receive Node 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the Send Node and to an optical receiver on the Receive Node.

This configuration physically enforces one-way data transfer at both ends of the optical fiber connecting the Send Node 101 to the Receive Node 102, thereby creating a truly unidirectional one-way data link between the source network 104 and the destination network 105 shown in FIG. 1. Unlike the conventional firewalls, one-way data transfer systems based on a one-way data link are designed to transfer data or information only in one direction and it is physically impossible to transfer data or information of any kind in the reverse direction. No information or data of any kind, including handshaking messages, such as those used when transferring data via TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

The modern network communications involve various data types, such as files, e-mails, Web contents, real-time audio/video data streams, etc. For each of these data types, there is a transport layer protocol that is suitable for the data type. For example, for transfer of files, e-mails, Web contents, syslog messages, etc., the Transmission Control Protocol (TCP) appears to be suitable for its reliability. On the other hand, for transfer of real-time audio/video data streams, which is time-sensitive, the User Datagram Protocol (UDP) is typically used. In this connection, it is often desirable and necessary to implement concurrent transfer of data streams involving two or more transport layer protocols across a single one-way data link between two nodes of a network.

It is an object of the present invention to implement concurrent data transfer involving two or more transport layer protocols over a single one-way data link.

It is yet another object of the present invention to implement concurrent transfer of data streams based on different transport layer protocols over a single one-way data link.

Other objects and advantages of the present invention will become apparent from the following description.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

SUMMARY OF THE INVENTION

It has now been found that the above and related objects of the present invention are obtained in the form of several related aspects.

More particularly, the present invention relates to a data transfer application for concurrent data transfer involving two or more transport layer protocols from a send node to a receive node through a single one-way link, comprising a data sending application in the send node capable of receiving data streams based on the two or more transport layer protocols and transferring the data streams concurrently across the one-way link, and a data receiving application in the receive node for receiving the data streams from the one-way link and forwarding the data streams to intended destinations.

The present invention is also directed to a one-way data transfer system, comprising a send node coupled to two or more source platforms, a receive node coupled to two or more destination platforms, a one-way link interconnecting the send node and the receive node for unidirectional transfer from the send node to the receive node, and a data transfer application for concurrent data transfer involving two or more transport layer protocols from the send node to the receive node through the one-way link.

Furthermore, the present invention also relates to a machine readable medium having instructions stored on a send node and a receive node interconnected by a single one-way link for unidirectional transfer from the send node to the receive node, the instructions, when executed by the send node, causing the send node to maintain two or more open sockets to receive data streams based on two or more transport layer protocols from two or more source platforms, receive the data streams, and concurrently transfer the data streams to the one-way link, and the instructions, when executed by the receive node, causing the receive node to forward the data streams received from the send node to corresponding destination platforms.

DETAILED DESCRIPTION OF PREFERRED EMBODIMENTS

The transfer of data streams based on different transport layer protocols in a secure one-way data transfer system may be implemented by having a separate hardware and/or software dedicated for each transport layer protocol. FIGS. 2-5 schematically illustrate examples of implementation of one-way data transfer dedicated to a single transport layer protocol.

Figure 1:
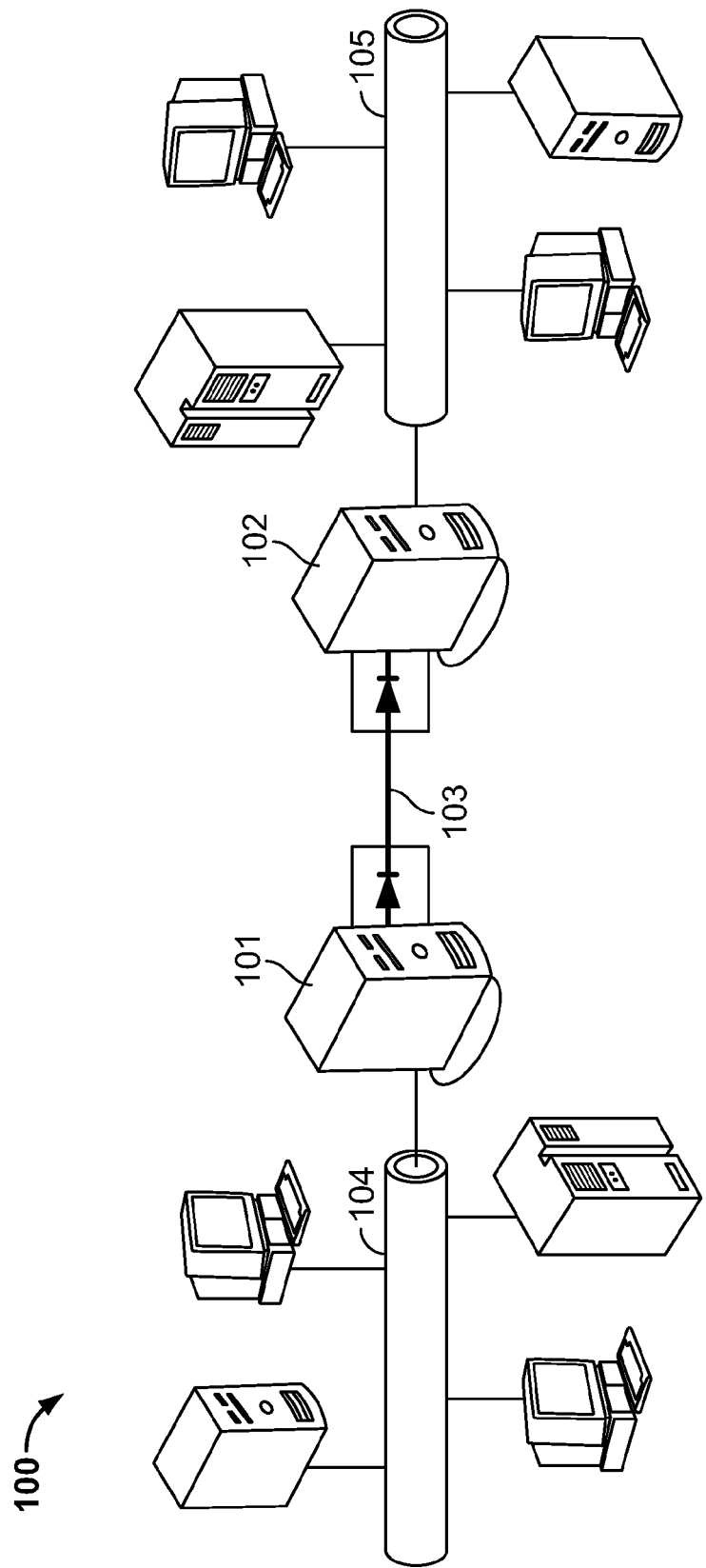
FIG. 1 schematically illustrates an example of a secure one-way data transfer system based on a one-way data link.
Figure 2:
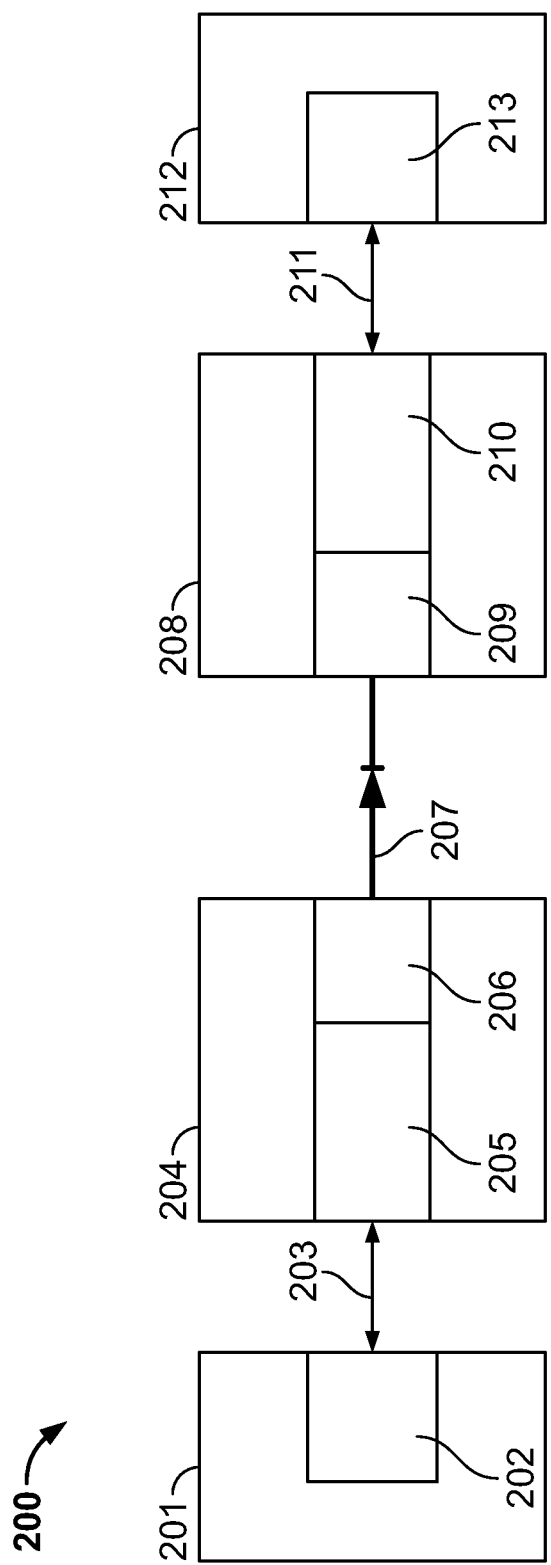
FIG. 2 is a functional block diagram that schematically illustrates TCP data packet transfer across a single one-way data link.

FIG. 2 is a functional block diagram that schematically illustrates implementation of a TCP-based secure data packet transfer across a single one-way data link in a one-way data transfer system 200. Construction of the conventional TCP sockets requires bilateral communications for they require an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called a TCP proxy, which is preferably TCP/IP socket-based proxy software, but may also be hardware-based or based on a suitable combination of software and hardware, to simulate the TCP/IP protocol across the one-way data link 207.

A TCP server proxy 205 fully implements the TCP/IP protocol in its bilateral communications 203 with the upstream TCP/IP data packet client 202 residing in a source platform 201. The TCP server proxy 205 may reside within the send node 204 as shown in FIG. 2, or alternatively, may be separate from but coupled to the send node 204.

When the TCP server proxy 205 receives the data packets from the TCP/IP data packet client 202, it removes the IP information normally carried in the data packets under the TCP/IP protocol and replaces it with pre-assigned channel numbers, so that no IP information is sent across the one-way data link 207. Instead, IP routes may be defined at the time of the configuration of the system 200 in the form of channel mapping tables residing in the TCP server proxy 205 associated with the send node 204 and the TCP client proxy 210 associated with the receive node 208. The send node 204 then sends the data packet with the pre-assigned channel numbers to the receive node 208 through its interface 206 across the one-way data link 207, which are received by the receive node 208 through its interface 209. A TCP client proxy 210, which may or may not reside in the receive node 208, then maps the channel numbers from the received data packet to the corresponding predetermined IP address of a destination platform 212. Like the TCP server proxy 205, the TCP client proxy 210 acts as a TCP/IP client, fully implementing the TCP/IP protocol in its bilateral communications 211 with the TCP data packet server 213 residing in the destination platform 212, requests a socket connection to the TCP server 213, and delivers the data packets received from the source platform 201 to the TCP data packet server 213 in the destination platform 212.

For the security of the overall one-way data transfer system 200, the IP address-to-channel number mapping table residing in the send node 204 may be different from the channel number-to-IP addressing mapping table residing in the receive node 208, and furthermore, neither table may be reconstructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications provides may provide means for error detection. However, the one-way data link 207 forecloses such means. Instead, the one-way data transfer system 200 may assure data integrity by applying, for example, a hash algorithm such as MD5 to each data packet being transferred over the one-way data link 207. The send node 204 calculates an MD5 hash number associated with the content of each data packet to be sent to the receive node 208 over the one-way data link 207. When the receive node 208 receives the data packet, it may re-calculate a MD5 hash number associated with the received data packet and compare the result with the MD5 hash number calculated by the send node 204. By comparing these results, the receive node 207 may be able to determine as to whether any error has occurred during the transfer of the data packets across the one-way data link.

Figure 3:
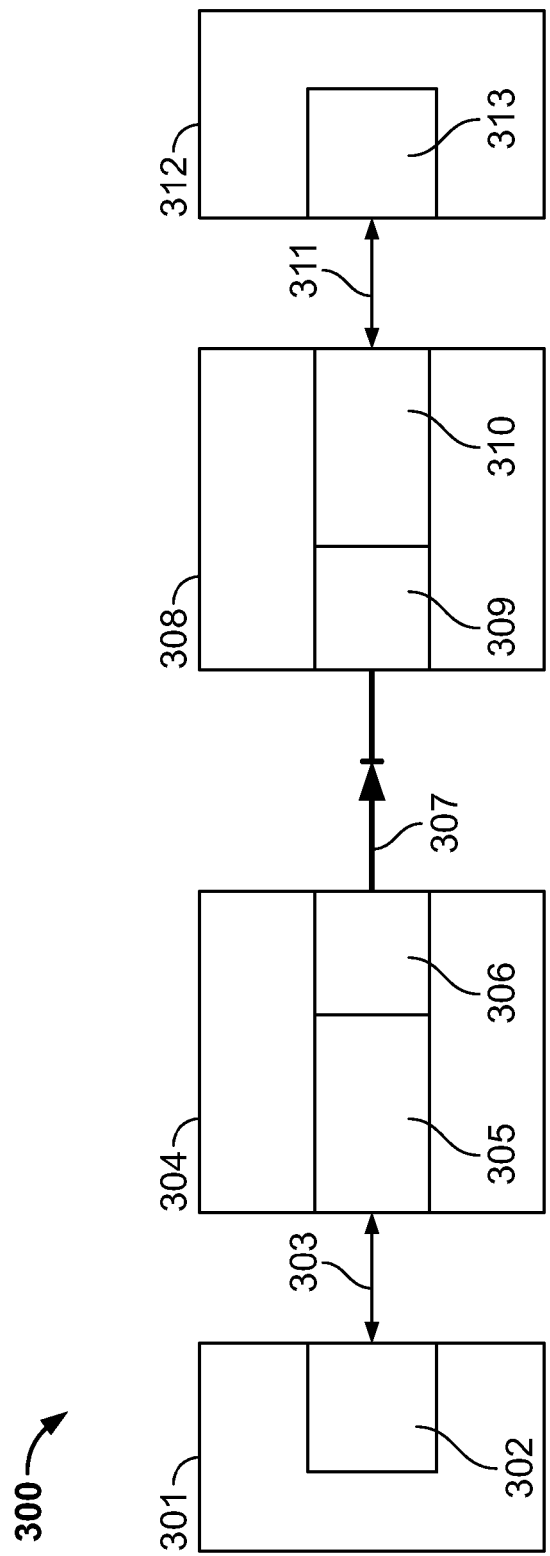
FIG. 3 is a functional block diagram that schematically illustrates TCP file transfer across a single one-way data link.

A similar configuration may be used to transfer files across a one-way data link under the TCP/IP protocol. FIG. 3 is a functional block diagram that schematically illustrates implementation of a TCP-based file transfer across a single one-way link 307 in a one-way data transfer system 300. Like the one-way data transfer system 200 for transferring data packets across a one-way link in FIG. 2, a TCP server proxy 305 fully implements the TCP/IP protocol in its bilateral communications 303 with the upstream TCP file client 302 residing in a source platform 301. The TCP server proxy 305 may reside within the send node 304 as shown in FIG. 3, or alternatively, may be separate from but coupled to the send node 304. After the TCP server proxy 305 receives files from the TCP file client 302, the send node 304 sends the files through its interface 306 to the one-way data link 307. After the receive node 308 receives the files through its interface 309 from the one-way data link 307, the TCP client proxy 310, which may or may not reside in the receive node 308, communicates under the full implementation of the TCP/IP protocol with a TCP file server 313 residing in a destination platform 312 and forwards the received files to the TCP file server 313.

Like the TCP-based data packet transfer system 200 in FIG. 2, the TCP-based file transfer system 300 may be configured to prohibit transmission of IP information across the one-way data link 307 and may instead require that predetermined IP routes be established at the time of the configuration of the system 300. The TCP server proxy 305 removes the associated IP information from the received files and replaces it with pre-assigned channel numbers. The send node 304 then sends the files with the pre-assigned channel numbers to the receive node 308 across the one-way data link 307. Upon receipt of the files, the TCP client proxy 310 then maps the channel numbers from the received files to the corresponding predetermined IP address of a destination platform 312, to which the files are forwarded.

Figure 4:
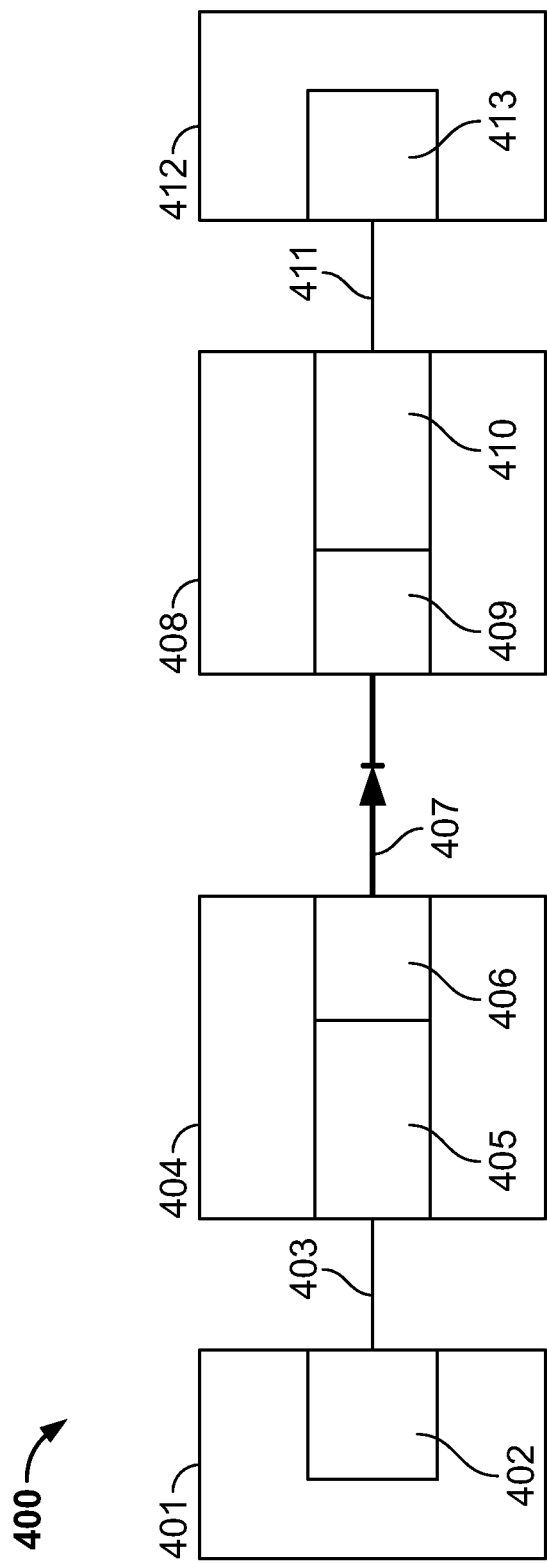
FIG. 4 is a functional block diagram that schematically illustrates UDP datagram transfer across a single one-way data link.

FIG. 4 is a functional block diagram that schematically illustrates implementation of a UDP-based data transfer across a single one-way link. While lacking the reliability that TCP provides, UDP is a simple connectionless protocol for network applications that need to transport data between computers over IP networks with minimal time delay. Accordingly, it is suitable for transporting time-sensitive data streams such as audio/video data streams. The network applications that typically use UDP include the Domain Name System (DNS), streaming media applications such as MPEG4 video applications, Voice over IP (VoIP), Trivial File Transfer Protocol (TFTP), Syslog, and Simple Network Management Protocol (SNMP).

One exemplary implementation of the UDP-based datagram transfer system 400 as shown in FIG. 4 is described as follows. Under the full implementation of a UDP connection 403 to a UDP socket 405 of the send node 404, a UDP source 402 transmits in real time an MPEG4 video stream generated by a DVD player connected to the source platform 401. The MPEG4 video stream is transmitted in real time to the UDP socket 405, transferred through an interface 406 of the send node 404 to the one-way data link 407, and then is received by the receive node 408 through its interface 409. The UDP socket 410 in the receive node 408 makes a fully implemented UDP connection 411 with a UDP destination 413 residing in a destination platform 412 and forwards the received MPEG4 video stream to the UDP destination 413. Preferably, this transfer of UDP datagrams from the source platform 401 to the destination platform 412 via the one-way data link 407 is conducted without any appreciable data losses or errors and without any observable time latency or delay. In this way, a local video display residing in or connected to the source platform 401 and a remote video display residing in or connected to the destination platform 412 may display the MPEG4 video stream in real time almost simultaneously.

Like the TCP-based data transfer systems 200 and 300 shown in FIGS. 2 and 3, respectively, the UDP-based data transfer system 400 shown in FIG. 4 may be configured to prohibit passage of IP information across the one-way data link 407. Instead of allowing passage of IP information, the UDP socket 405 may be configured to issue a token identifier, such as a channel number, to each datagram to be transferred across the one-way data link 407. Such identifier reflects the source and destination of the datagram to be transferred across the one-way data link 407 without indicating their IP addresses. Once the datagram is received by the receive node 408, the UDP socket 410 then routes the datagram to the UDP destination 413 based on the identifier associated with the received datagram.

Figure 5:
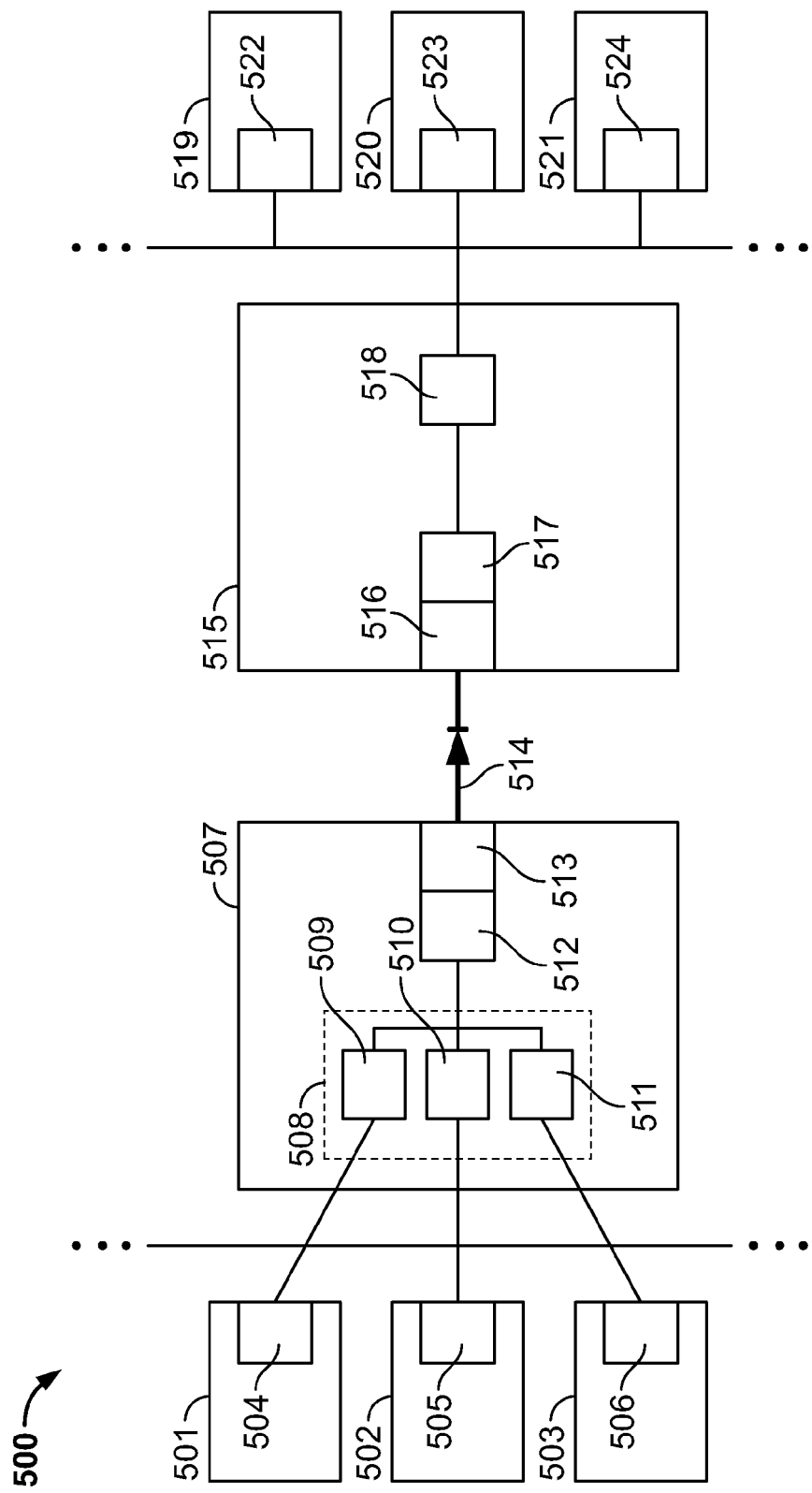
FIG. 5 is a functional block diagram that schematically illustrates transfer of multiple UDP datagram streams across a single one-way link using a multiplexing and demultiplexing applications.

FIG. 5 illustrates another example of the UDP-based datagram transfer system 500 where a pair of a multiplexer 508 and a de-multiplexer 518 enables concurrent transfer of multiple UDP datagram streams from a plurality of source platforms 501-503 to the corresponding number of destination platforms 519-521 through a single one-way data link 514. The multiplexer 508 and demultiplexer 518 are preferably software-based, but could also be hardware-based. The multiplexer 508 may reside in the send node 507, as shown in FIG. 5. Alternatively, the multiplexer 508 may reside outside the send node 507. Alternatively, the multiplexer 508 may be part of the source network interconnecting the source platforms 501, 502, 503. Likewise, the demultiplexer 518 may either reside in the receive node 515, reside outside the receive node 515, or be part of the destination network interconnecting the destination platforms 519, 520, 521.

The multiplexer 508 acts as a multicast client and registers with the source platforms 501-503. Datagram streams from a plurality of UDP sources 504, 505, 506, respectively residing in the source platforms 501, 502, 503 are input into the corresponding UDP listening ports 509, 510, 511 of the multiplexer 508. For example, the source platforms 501, 502, 503 providing UDP sources 504, 505, 506 may comprise, or are connected to, an IP/TV server (e.g., Cisco IP/TV server) connected to a digital camera or camcorder, a video server (e.g., Digital Rapids video server) connected to a cable TV, DVD or VCR players, and VLC media player. Other possible UDP sources include syslog application, SNMP, and MPEG4 streaming video.

Upon receiving the UDP datagrams through multiple UDP listening ports 509, 510, 511, the multiplexer 508 passes the UDP datagrams to a single UDP socket 512 residing in the send node 507. The send node 507 then proceeds to send the UDP datagrams through its interface 513 to the one-way data link 514.

Upon receiving the datagrams from the send node 507 through the one-way data link 514 and its interface 516 thereto, the receive node 515 inputs the received UDP datagrams into a demultiplexer 518 through a UDP socket 517 residing in the receive node 515. The demultiplexer 518 acts as a multicast server to which destination platforms 519-521 register prior to receiving the datagrams. The demultiplexer 518 routes the UDP datagrams to their intended UDP destinations 522, 523, 524 respectively residing in the destination platforms 519, 520, 521. The demultiplexer 518 may use a configuration file (e.g., demux_config.txt) to establish routing configuration (one-to-one, one-to-many, many-to-one) for routing the UDP datagrams to the proper UDP destinations 522, 523, 524. In this way, the UDP-based one-way data transfer system 500 shown in FIG. 5 enables concurrent transfer of multiple UDP datagram streams from multiple source platforms 501-503 to the corresponding destination platforms 519-521 via a single one-way data link 514.

Figure 6:
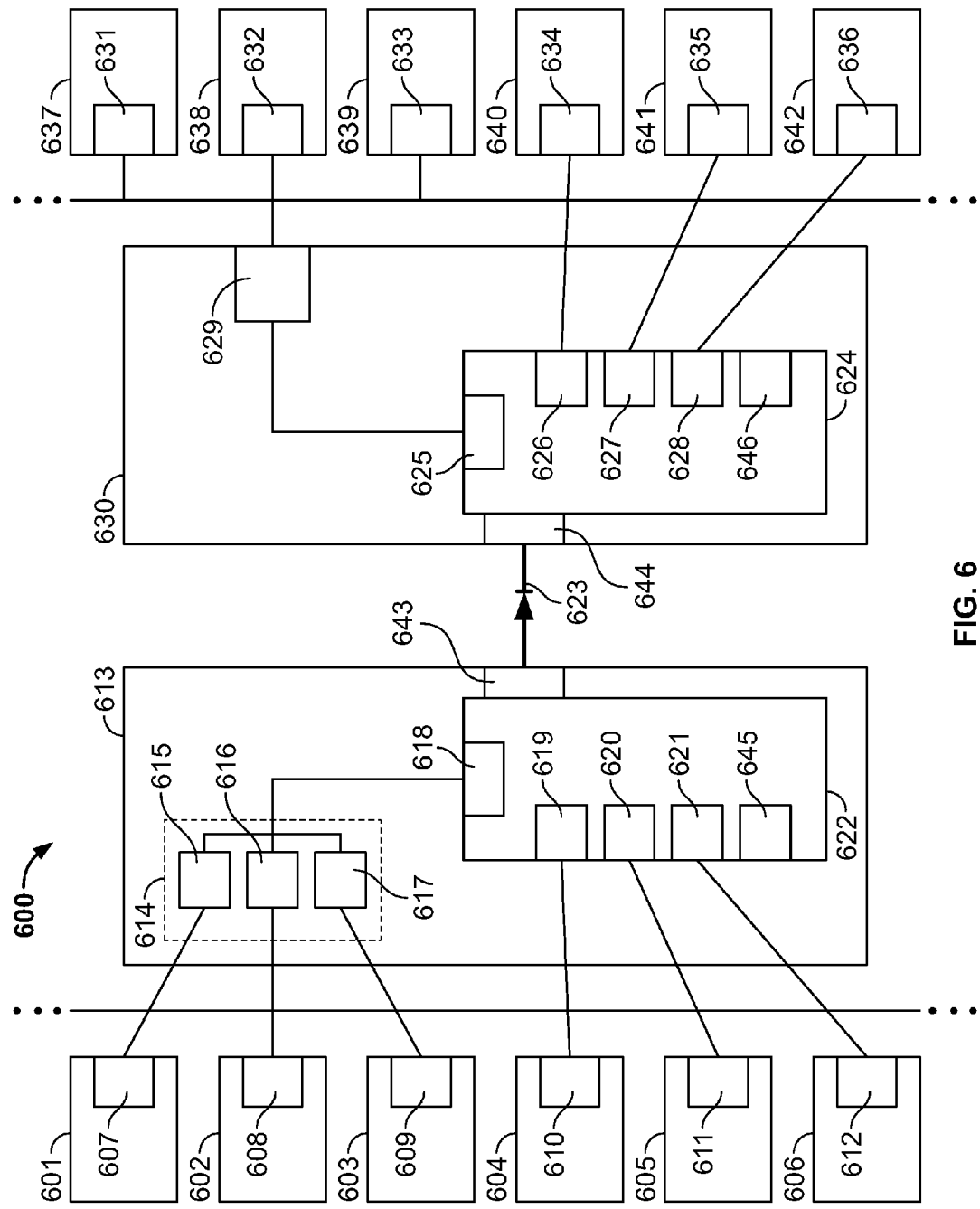
FIG. 6 is a functional block diagram that schematically illustrates one possible embodiment of the present invention for concurrent data transfer involving two or more transport layer protocols across a single one-way data link.

Each of FIGS. 2-5 schematically illustrates a one-way data transfer application dedicated to one particular transport layer protocol. In at least one embodiment of the present invention, these separate data transfer applications may be integrated into a single suite for concurrent transfer of data streams based on two or more transport layer protocols over a single one-way data link. FIG. 6 schematically illustrates an example of one such integrated configuration for concurrent transfer involving more than one transport layer protocol. This approach achieves a greater degree of flexibility and reduction in complexity in routing compared to having a separate configuration for each transport layer protocol.

FIG. 6 is a functional block diagram schematically illustrating one exemplary embodiment of the present invention wherein the above-described TCP- and UDP-based data transfer applications illustrated in FIGS. 2-5 are integrated together. With such integration, the one-way data transfer system 600 illustrated in FIG. 6 is configured to concurrently perform at least all of the same or substantially the same data transfer functions and operations of the TCP-based one-way data transfer systems 200, 300 shown in FIGS. 2 and 3, and the UDP-based one-way data transfer systems 400, 500 shown in FIGS. 4 and 5, as described above.

In FIG. 6, a data sending application 622 residing in a send node 613 and a data receiving application 624 residing in a receive node 630 enable concurrent transfer of data streams based on two or more transport layer protocols (in this case, at least UDP and TCP) from a plurality of source platforms 601-606 to the corresponding destination platforms 637-642 via a single one-way data link 623. The data sending application 622 and the data receiving application 624 are preferably software-based, but may also be hardware-based or based on a suitable combination of software and hardware implementations.

The data sending application 622 is capable of hosting simultaneously ports corresponding to more than one transport layer protocol to receive data streams based thereon. For example, as shown in FIG. 6, the data sending application 622 may host one or more TCP ports 619-621 and one or more UDP sockets 618 simultaneously. During operation, the data sending application 622 may be configured to maintain all of the TCP ports and UDP sockets 618-621 open to receive incoming data from any of the multiple TCP transfer clients 610-612 and UDP sources 607-609 residing in the source platforms 601-606. It may additionally host one or more ports or sockets 645 for other types of transport layer protocol at the same time. Likewise, the data receiving application 624 is capable of hosting one or more TCP ports 626-628 and one or more UDP sockets 625, as well as additional ports or sockets 646 for other types of transport layer protocols, simultaneously.

Like the TCP server and client proxies 205, 210 in FIG. 2 and UDP sockets 405, 410 in FIG. 4, proxy applications may be implemented respectively in the TCP ports 619-621 and the UDP socket 618 in the data sending application 622 and the TCP ports 626-628 and the UDP socket 625 in the data receiving application 624 to simulate the conventional transport layer protocols such as TCP and UDP so that no IP information needs to be passed across the one-way data link 623. The data sending application 622 may be configured to assign a unique channel number to each of the incoming data streams from the multiple source platforms 601-606. In this case, the data receiving application 624 may be configured to map the channel numbers of the data streams received from the data sending application 622 to the IP addresses of their intended destination platforms 637-642.

For TCP data packets or files, available TCP ports 619-621 may be defined in a configuration file (e.g., Hostports.txt) residing in the data sending application 622. Each of the listed TCP ports may be associated with a unique channel ID number. For each entry in the configuration file of the data sending application 622, there is a corresponding entry in a configuration file (e.g., Portmap.txt) of the data receiving application 624, which defines the destination TCP ports 626-628 and provides the address information for downstream routing, such as IP address information for the destination platforms 640-642. In addition, the TCP data packets or files being transported from the data sending application 622 to the data receiving application 624 may be tracked with session numbers and data sequence numbers to assure that data arrives in the correct temporal sequence.

Likewise, each instance of operation of the multiplexer 614 based on the receipt of datagram at one of the available UDP listening ports 615-617 may trigger assignment of a unique channel ID number corresponding to the receiving UDP listening port. A configuration file (e.g., demux_config.txt) residing in the demultiplexer 629 associated with the receive node 630 then maps the channel ID number of the received UDP datagram to the address information of the UDP destination 631-633 and the destination platform 637-639 to complete the downstream routing.

The data sending and data receiving applications 622, 624 in the one-way data transfer system 600 may process the data packets, files, and/or datagrams sequentially in the order they were received, and may further be configured to process each of them only once. In addition, the data sending and data receiving applications 622, 624 may be configured to prevent any crosstalk, a possible interlacing of source data stream with wrong destination data stream, by a tight message protocol between the send node interface 643 and the receive node interface 644.

In the one-way data transfer system 600 illustrated in FIG. 6, multiple channels of TCP-based data from the TCP transfer clients 610-612 residing in the source platforms 604-606 can be concurrently input into the TCP ports 619-621 hosted by the data sending application 622 in the send node 613. The TCP transfer clients 610-612 may include one or more TCP file transfer clients (like the TCP file transfer client 302 in FIG. 3) and/or one or more TCP data packet transfer clients (like the TCP data packet transfer client 202 in FIG. 2). Additionally, the TCP transfer clients 610-612 may include a print application from one of the source platforms 604-606, with the corresponding destination platform 640-642 being a printer. Upon receiving these multiple data streams from the TCP transfer clients 610-612, the data sending application 622 in the send node 613 then concurrently transfers them, along with any other data type (to be further described below), to the one-way data link 623 through the send node interface 643.

When the data receiving application 624 in the receive node 630 receives the concurrently transferred data streams from the one-way data link 623 through the receive node interface 644, it routes them to their respective TCP ports 626-628, based on, for example, their unique channel ID numbers. The TCP client proxy applications associated with these TCP ports 626-628 are in fully implemented TCP/IP communication with the TCP transfer servers 634-636 residing in the destination platforms 640-642 and forward their received data to the intended destination platforms.

At the same time, multiple UDP datagram streams from the UDP sources 607-609 residing in the source platforms 601-603 can be concurrently input into the corresponding UDP ports 615-617 of a multiplexing application 614 associated with the send node 613. Examples of the possible UDP sources 607-609 include syslog application, SNMP, and/or streaming video. The Multiplexing application 614 then concurrently routes these multiple UDP datagram streams from different sources into a single UDP socket 618 hosted by the data sending application 622, which then transfers these UDP datagram streams, along with any other data type as described above, to the one-way data link 623 through the send node interface 643.

Upon receiving these concurrently transferred multiple UDP datagram streams from the one-way data link 623 through the receive node interface 644, the data receiving application 624 routes them to the demultiplexing application 629 through the UDP socket 625. The demultiplexing application 629 then de-multiplexes and routes the UDP datagram streams to their respective UDP destinations 631-633 residing in the destination platforms 637-639, based on, for example, the unique channel ID numbers associated with the received datagram streams.

An example of routing configuration for concurrently transporting a TCP file and a UDP-based streaming video by the one-way data transfer system 600 is now described. A TCP file from a TCP file transfer client 610 in a source platform 604 with an IP address of 192.168.5.5 is received by a TCP port 619 of the data sending application 622 in the send node 613. The receiving TCP port 619 is assigned with a listen port number of 2000. The configuration file, Hostports.txt, of the data sending application 622 assigns a unique channel ID number of 3 to correspond to the above IP address of the source platform 604 and the listen port number of the TCP port 619. The corresponding entry in the configuration file, Portmap.txt, of the data receiving application 624 may be made at the time of the system configuration to set the channel ID number of 3 to map to a destination TCP port number of 2500 and a destination IP address of 192.168.10.15.

The TCP server proxy application associated with the TCP port 619 in the data sending application 622 replaces any IP address information contained in the TCP file with this channel ID number and send the TCP file through the send node interface 643 to the one-way data link 623. Upon receiving the TCP file from the one-way data link 623 through the receive node interface 644 and based on the routing configuration information in Portmap.txt file, the data receiving application 624 in the receive node 630 routes the received TCP file through the proper TCP port 626 to the TCP file transfer server 634 with the TCP port number of 2500 residing in the destination platform 640 having an IP address of 192.168.10.15. The TCP file transfer server 634 may further forward the TCP file to a download directory (e.g., d:\test2503\data\download) based on the content of its own configuration file (Hostports-file.txt).

At the same time, a streaming video from a UDP source 609 in a source platform 603 having an IP address of 192.168.5.10 is received by a UDP listening port 617 of a multiplexing application 614 in the send node 613. The multiplexer 614 assigns a channel ID number of 5 to the streaming video data coming through the UDP port 617. The streaming video data is then forwarded to a UDP socket 618 in the data sending application 622 and transferred to the receive node 630 via the same one-way data link 623 concurrently with the previously described TCP file. The data receiving application 624 then transfers the received streaming video from a UDP socket 625 to a demultiplexing application 629. The demultiplexer 629 has a configuration file, demux_config.txt, which maps the channel ID number 5 associated with the streaming video to a UDP destination 633 having a port number of 11998 in a destination platform 639 having an IP address of 192.168.10.25. Based on its configuration file, the demultiplexer 629 then forwards the streaming video to the UDP destination 633 accordingly.

In this way, the present invention achieves a great degree of flexibility and reduced complexity in routing configuration for a secure one-way data transfer system by providing, for example, seamless network connectivity under a plurality of different transport layer protocols, such as TCP and UDP. In addition to the ones described above, the present invention provides a wide variety of routing configuration options with few constraints For instance, non-unique multiplexing channels may be defined to collate multiple data streams from sources of the same type to a final common destination for processing. Typically, these could be of the following forms of UDP datagrams: (a) collating SNMP trap messages from one or more remote machines on the send side for processing by a receive side network monitoring system; (b) collating syslog messages from one or more remote machines on the send side for processing by a receive side network monitoring system; and (c) collating UDP datagrams from one or more remote sensors for processing by a receive side data gathering/analyzing system. In addition, one skilled in the art would be able to implement transport layer protocols other than TCP and UDP described above as an example in accordance with the present invention.

Furthermore, to satisfy a desired level of quality of service, the present invention may be flexible enough to modify concurrent data transfer by, for example, assigning and enforcing different priorities on different data streams or different transport layer protocols. For example, it may be desirable to give priority to unacknowledged source streams of data over acknowledged source streams of data. This would be UDP/IP vs. TCP/IP, respectively. In this way, data traffic that cannot retry its transfer would be given priority for transfer across the one-way link.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A system for transferring data across a single one-way link, comprising:
    a single one-way link having an input and an output, the single one-way link adapted to transfer data only from the input to the output and to prevent any signal from passing from the output to the input;
    a data transmitter coupled to the input of the single one-way link and for receiving the data in two or more different types of transport layer protocols from source platforms, replacing an Internet Protocol (IP) information of the source platforms with a channel number, and transmitting the data in the two or more different types of transport layer protocols across the one-way link concurrently; and
    a data receiver coupled to the output of the single one-way link and for receiving the data in the two or more different types of transport layer protocols from the one-way link and forwarding the data in the two or more different types of transport layer protocols to destination platforms,
    wherein an IP information of the destination platforms remains undisclosed at the source platforms.

2. The system of claim 1, wherein each of the data transmitter and the data receiver hosts sockets corresponding to the two or more different types of transport layer protocols to receive the data in the two or more different types of transport layer protocols.

3. The system of claim 2, wherein the sockets comprise one or more UDP ports and one or more TCP ports.

4. The system of claim 1, wherein the two or more different types of transport layer protocols comprise UDP and TCP.

5. A one-way data transfer system, comprising
two or more source platforms;
two or more destination platforms;
a single one-way link for unidirectional transfer, the single one-way link having an input and an output, the single one-way link adapted to transfer data only from the input to the output and to prevent any signal from passing from the output to the input;
a data transmitter coupled to the input of the single one-way link and for receiving the data in two or more different types of transport layer protocols from the two or more source platforms, replacing an Internet Protocol (IP) information of the source platforms with a channel number, and transmitting the data in the two or more different types of transport layer protocols across the one-way link concurrently; and
a data receiver coupled to the output of the single one-way link and for receiving the data in the two or more different types of transport layer protocols from the one-way link and forwarding the data in the two or more different types of transport layer protocols to the two or more destination platforms,
wherein an IP information of the destination platforms remains undisclosed at the source platforms.

6. The one-way data transfer system of claim 5, wherein each of the data transmitter and the data receiver hosts sockets corresponding to the two or more different types of transport layer protocols to receive the data in the two or more different types of transport layer protocols.

7. The one-way data transfer system of claim 6, wherein the sockets comprise one or more UDP ports and one or more TCP ports.

8. The one-way data transfer system of claim 5, wherein the two or more different types of transport layer protocols comprise UDP and TCP.

9. A non-transitory machine readable medium having instructions stored on a send node and on a receive node, the send node and the receive node interconnected by a single one-way link for unidirectional transfer from the send node to the receive node, the single one-way link having an input and an output, the single one-way link adapted to transfer data only from the input to the output and to prevent any signal from passing from the output to the input, the instructions, when executed by the send node, causing the send node to:
maintain two or more open sockets to receive the data in two or more different types of transport layer protocols from source platforms;
receive the data in the two or more different types of transport layer protocols;
replace an Internet Protocol (IP) information of the source platforms with a channel number; and
transmit the data in the two or more different types of transport layer protocols concurrently across the one-way link,
and the instructions, when executed by the receive node, causing the receive node to:
forward the data in the two or more different types of transport layer protocols received from the send node to destination platforms,
wherein an IP information of the destination platforms remains undisclosed at the source platforms.

10. The non-transitory machine readable medium of claim 9, wherein the two or more different types of transport layer protocols comprise UDP and TCP.

11. The non-transitory machine readable medium of claim 9, wherein the two or more open sockets comprise one or more UDP ports and one or more TCP ports.

* * * * *